(12) United States Patent
Boutouil et al.

(10) Patent No.: US 9,783,080 B2
(45) Date of Patent: Oct. 10, 2017

(54) MOTOR-DRIVEN HINGE DEVICE FOR VEHICLE SEAT HINGE

(71) Applicant: Faurecia Sièges d'Automobile, Nanterre (FR)

(72) Inventors: Naoufel Boutouil, Flers (FR); Nicolas Navatte, Conde sur Noireau (FR)

(73) Assignee: Faurecia Sieges d'Automobile, Nanterre (FR)

( * ) Notice: Subject to any disclaimer, the term of this patent is extended or adjusted under 35 U.S.C. 154(b) by 244 days.

(21) Appl. No.: 14/438,371

(22) PCT Filed: Oct. 9, 2013

(86) PCT No.: PCT/FR2013/052405
§ 371 (c)(1),
(2) Date: Apr. 24, 2015

(87) PCT Pub. No.: WO2014/064358
PCT Pub. Date: May 1, 2014

(65) Prior Publication Data
US 2015/0283924 A1    Oct. 8, 2015

(30) Foreign Application Priority Data
Oct. 26, 2012 (FR) .................................. 12 60249

(51) Int. Cl.
*B60N 2/225* (2006.01)
*F16H 1/28* (2006.01)
(Continued)

(52) U.S. Cl.
CPC ......... *B60N 2/0232* (2013.01); *B60N 2/2251* (2013.01); *B60N 2/2252* (2013.01);
(Continued)

(58) Field of Classification Search
CPC ...... B60N 2/225; B60N 2/2251; F16H 1/2863
See application file for complete search history.

(56) References Cited

U.S. PATENT DOCUMENTS

| 4,211,451 A * | 7/1980 | Shephard ............. B60N 2/2251 16/344 |
| 2003/0080599 A1* | 5/2003 | Hohn ..................... B60N 2/225 297/362 |
| 2007/0029893 A1 | 2/2007 | Schuler et al. |

FOREIGN PATENT DOCUMENTS

| DE | 202004020880 U1 | 5/2006 | |
| DE | 102005015831 A * | 9/2006 | ............. F16H 57/12 |

(Continued)

OTHER PUBLICATIONS

International Search Report for PCT/FR2013/052405 dated Apr. 3, 2014, 2 pages, translated.

*Primary Examiner* — Tisha Lewis
(74) *Attorney, Agent, or Firm* — Reising Ethington P.C.

(57) ABSTRACT

A motor-driven hinge device may include a hypocycloid hinge mechanism driven by a drive shaft, two metal side plates intended for connection to the seating portion and to the backrest, a brushless motor, and a planetary gear train positioned between the brushless motor and the drive shaft. The planetary gear train may include a sun gear connected to the motor rotor, and a plurality of planet gears, each planet gear having a first set of teeth engaging with the sun gear and with a first stationary ring gear, and a second set of teeth engaging with a second ring gear rigid with the drive shaft.

10 Claims, 11 Drawing Sheets

(51) Int. Cl.
*B60N 2/02* (2006.01)
*F16C 11/04* (2006.01)

(52) U.S. Cl.
CPC ...... *F16C 11/04* (2013.01); *B60N 2002/0236* (2013.01); *Y10T 16/541* (2015.01)

(56) References Cited

FOREIGN PATENT DOCUMENTS

| EP | 0319393 | | 6/1989 |
|---|---|---|---|
| FR | 2962385 | A1 | 1/2012 |
| WO | WO9220548 | | 11/1992 |
| WO | WO 02/064397 | A1 | 8/2002 |

\* cited by examiner

MOTOR-DRIVEN HINGE DEVICE FOR VEHICLE SEAT HINGE

TECHNICAL FIELD

The present invention relates to motor-driven hinge devices with electric motor and reduction gear, arranged to drive an element of a motor vehicle seat, for example to move a movable element relative to a reference element, for example a backrest relative to a seating part.

BACKGROUND

In the known prior art, many motor-driven hinge devices make use of a gearmotor, which comprises a brushless or DC motor and one or more gear stages for moving a movable element substantially in rotation relative to a reference element.

These motor-driven hinge devices must satisfy multiple constraints, the main ones being silent operation, maintaining position in the event of impact, reliability, small footprint, performance, and ease of integration.

According to document U.S. Pat. No. 7,544,142, a brushless single or double motor can be used, to which is added a complex differential gear, making the device expensive and possibly insufficiently resistant to impacts.

There is therefore a need for motor-driven hinge devices with electric motor and reduction gear (referred to as a "gearmotor") of simplified construction, sized to optimize their installation, particularly within a confined space of a vehicle seat, and which also help reduce noise from the operation of such gearmotors, achieving all this without decreasing the impact resistance of such hinge devices.

SUMMARY

The present invention proposes a motor-driven hinge device that is adapted to connect a backrest of a motor vehicle seat to a seating portion of said seat, in a rotational movement about a main axis, comprising:
  a first hypocycloid hinge mechanism driven by a drive shaft, comprising a first metal side plate for connection to the seating portion and a second metal side plate for connection to the backrest, the first and second side plates being connected by metal toothed sectors,
  a brushless motor having a rotor rotating about a rotor axis parallel to the main axis,
  a planetary gear train interposed between the brushless motor and the drive shaft, the planetary gear train comprising a sun gear rotating about the main axis and connected to the motor rotor, a plurality of planet gears each comprising a first set of teeth engaging with both the sun gear and a first stationary ring gear, and a second set of teeth engaging with a second ring gear rigid with the drive shaft,
  wherein the planetary gear train has no planet carrier.

With these arrangements, the architecture of such mechanisms can be simplified, and the operational noise and size of such mechanisms can be optimized to facilitate their installation and integration into the passenger compartment of motor vehicles, while maintaining good impact resistance and satisfactory performance. In addition, the assembly of such a mechanism is simplified.

In various embodiments of the invention, one or more of the following arrangements may possibly be used, individually or in combination:

all parts of the planetary gear train are made of plastic; thus optimizing the cost of the device;
  the device may further comprise a control unit arranged in immediate proximity to the brushless motor, for controlling said brushless motor, said brushless motor, the planetary gear train, and the control unit being contained in a closed casing; such that the device provides good reduction of electromagnetic emissions and the control unit is protected from external physical and chemical damage;
  the first set of teeth and the second set of teeth differ in their number of teeth by 1, and/or the number of teeth of the first ring gear differs from the number of teeth of the second ring gear; such that a reduction ratio of between 50 and 150 can be obtained for the planetary gear train;
  the reduction ratio of the planetary gear train is between 50 and 150 and the rotational speed of the motor is between 2000 revolutions/min and 7000 revolutions/min; such that a brushless motor of reduced dimensions can be selected;
  the reduction gear train and the motor can be arranged one beside the other in a plane perpendicular to the main axis, and are interconnected by a belt; such that the occupied volume is reduced axially;
  the planetary gear train and the brushless motor can be arranged one after the other in the axial direction; such that the occupied volume is reduced radially;
  the device may further comprise an intermediate planetary gear set interposed axially between the brushless motor and the planetary gear train; such that the performance of each gear stage can be optimized;
  the control unit is arranged to control the motor according to current output profiles with startup and shutdown ramps; to obtain smooth starts and stops.

The invention also relates to a seat frame for a motor vehicle, comprising a backrest frame, a seating portion frame, and at least one motor-driven hinge device as described above.

The motor-driven hinge device may further comprise a second hypocycloid hinge mechanism arranged on the side opposite to the first hypocycloid hinge mechanism, the drive shaft passing axially through the planetary gear train and connecting the two hypocycloid hinge mechanisms.

The invention also relates to a motor vehicle seat comprising at least one drive device as described above.

BRIEF DESCRIPTION OF THE DRAWINGS

Other features, objects, and advantages of the invention will become apparent from reading the following description of two of its embodiments, given as non-limiting examples with reference to the accompanying drawings, in which.

DESCRIPTION OF THE ILLUSTRATED EMBODIMENTS

In the various figures, the same references designate identical or similar elements.

Figure 1:
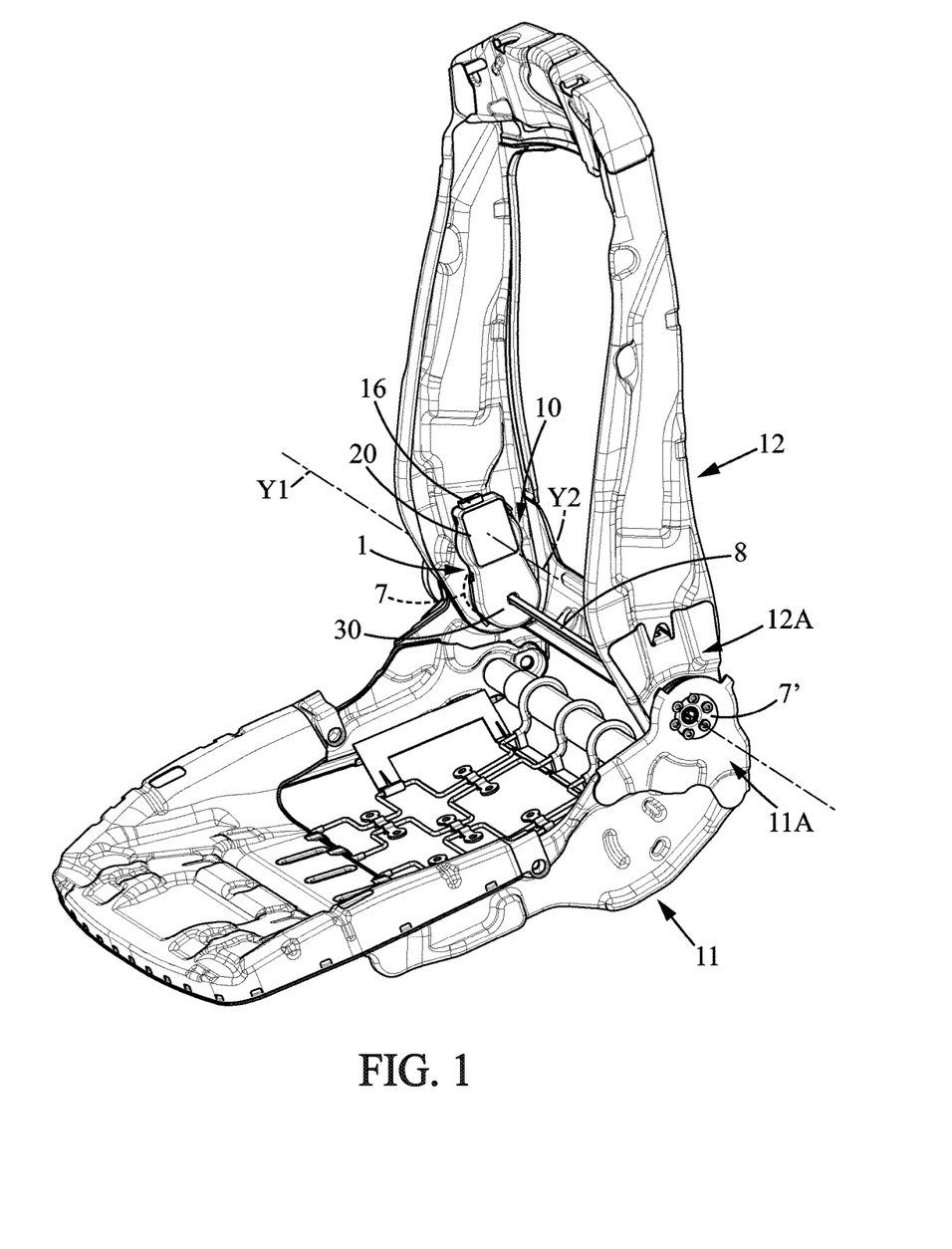
FIG. 1 is a perspective view of a seat frame incorporating a motor-driven hinge device according to a first embodiment of the invention.

FIG. 1 represents a perspective view of a seat frame incorporating a motor-driven hinge device 1, also referred to for simplicity as a "motorized hinge device" 1, according to a first embodiment of the invention. Such a frame is covered with padding and a covering (not shown) to constitute the vehicle seat.

As illustrated in FIG. 1, the motor-driven hinge device 1 allows rotating the backrest relative to the seating portion in order to adjust the angular position for user comfort; however, the motor-driven hinge device must maintain the current position the rest of the time, including in the event of vehicle impact.

The frame in question comprises a seating portion structure 11 and a backrest structure 12 mounted so as to rotate on the seating portion structure 11 about a main hinge axis Y. In the hinge area, the frame comprises a first hinge mechanism 7 on the right side of the seat (indicated by dotted lines in FIG. 1) and a second hinge mechanism 7' (partially visible) on the left side of the seat.

The seating portion structure 11 may further comprise a seating portion side plate 11A on each side, attached to and facing one of the hinge mechanisms 7,7', and the backrest structure 12 may similarly comprise a backrest side plate 12A on each side, attached to and facing one of the hinge mechanisms 7,7'. Note that the backrest structure 12 may be hinged on the backrest side plate 12A in the case of a function where rear seat access is provided.

As illustrated in FIGS. 1 to 6, in the example shown, each hinge mechanism 7,7' is a hypocycloid reduction gear mechanism as known for seat hinges of the prior art and described for example in document FR2962385.

Each hinge mechanism 7 (respectively 7') comprises a first metal side plate 71 to be connected to the seating portion 11, directly or via the seating portion side plate 11A, and a second metal side plate 72 to be directly connected to the backrest 12 via the backrest side plate 12A.

Figure 8:
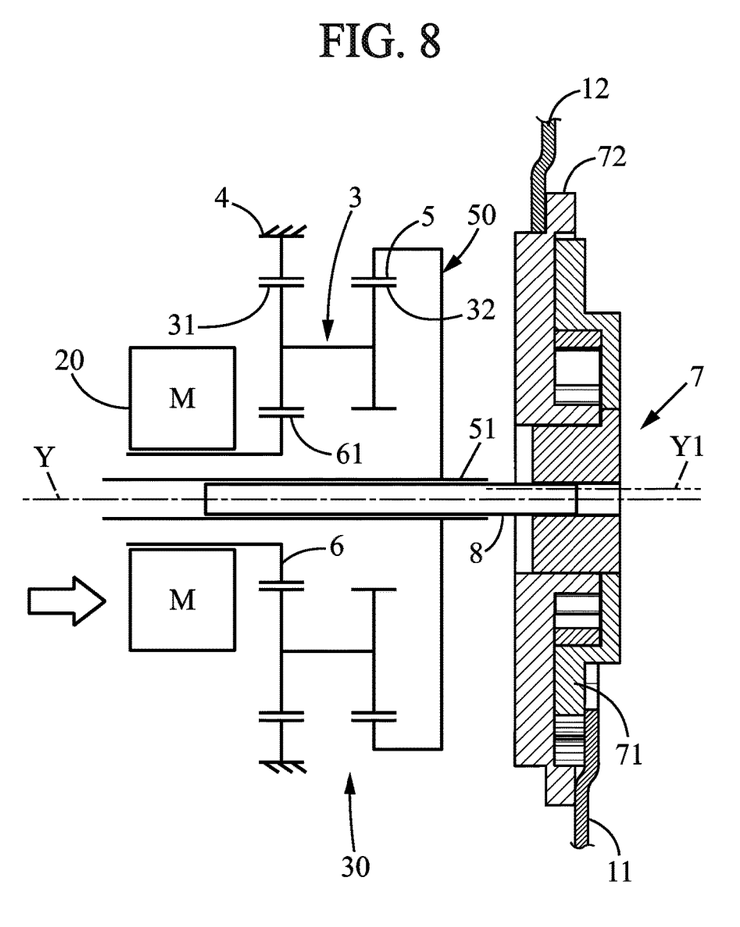
FIG. 8 is a schematic axial section diagram of the motor-driven hinge device of FIG. 7.
Figure 9:
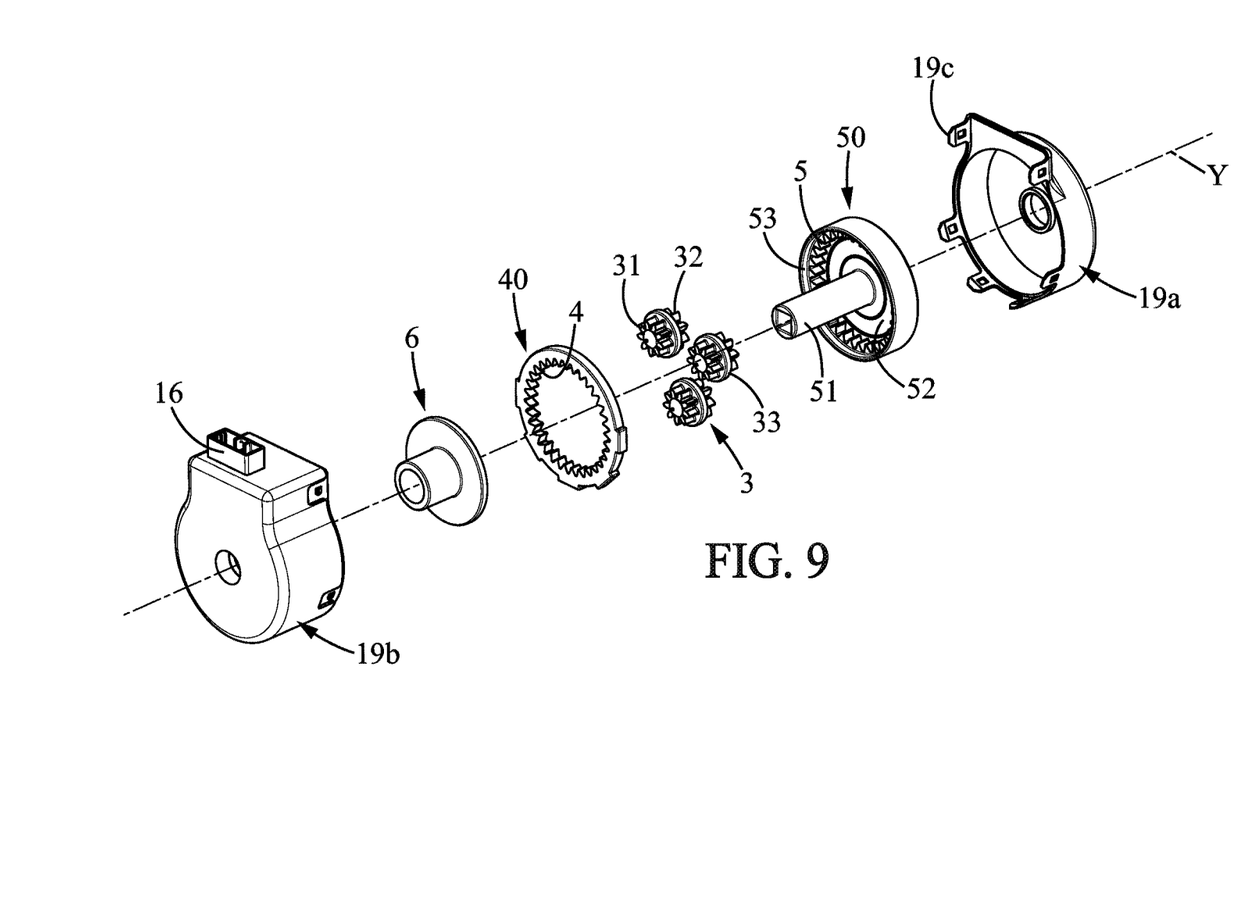
FIG. 9 is an exploded view of the drive device of FIG. 7, viewed from one side.
Figure 10:
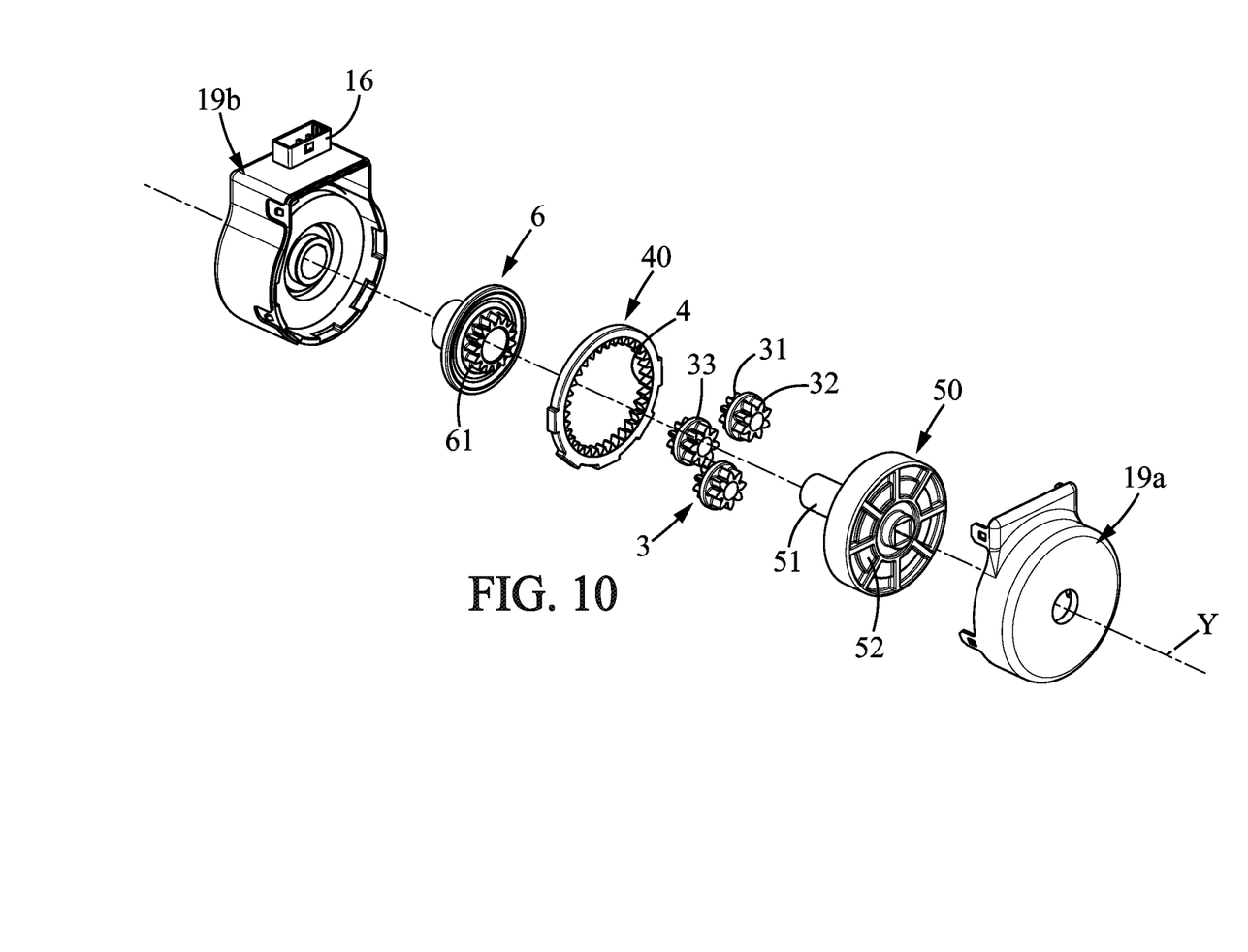
FIG. 10 is an exploded view of the drive device of FIG. 7, viewed from the opposite side.

In a known manner, the first and second side plates 71,72 are connected, directly or indirectly, by toothed sectors. In the example illustrated, a radially external set of teeth 76 of the first side plate engages with a radially internal set of teeth 75 of larger diameter of the second side plate, the first side plate 71 being rotated about Y with slight nutation due to an eccentric cam 73. The radially internal set of teeth 75 has one tooth more than the radially external set of teeth 76 of the second side plate. Further details on the structure and construction are given for example in document FR2962385, keeping in mind that FIGS. 4, 8 and 11 only schematically represent the hinge mechanism 7.

When the eccentric cam 73 completes a revolution, the teeth 76 of the first side plate 71 are angularly offset by one tooth relative to the teeth 75 of the second side plate 72.

A reduction of 1/N is thus obtained, where N is the number of teeth in the set of teeth of the first side plate. The first and second side plates are made by stamping or fine-blanking steel material, in order to support the torques applied between the backrest and seating portion, particularly during vehicle impact. The number of teeth will be, for example, 35 and 36. The teeth 75,76 are metal and are preferably formed integrally with the first and second side plates 71,72 respectively. The mechanical coupling between the first and second side plates thus gives the hinge irreversibility of movement and sufficient robustness to meet the increasingly restrictive criteria for impact resistance.

The eccentric cam 73 is rotated by a drive shaft 8, which passes through the seat frame from left to right in the example illustrated, in a manner that connects the two hinge mechanisms 7,7'.

It should be noted that in a simplified example not shown, the seat frame may have only one hinge mechanism 7, in which case the drive shaft 8 would be much shorter and would locally link the gearmotor, described below, with the single hinge mechanism 7.

The gearmotor 10 of the motor-driven hinge device 1 is housed in a casing 19 and comprises:
- a brushless motor 20 having a rotor 2 rotating about a rotor axis Y2 parallel to the main axis Y,
- a planetary gear train 30 interposed between the brushless motor 20 and the drive shaft 8, the planetary gear train 30 comprising a drive member 6, a plurality of planet gears 3, and ring gears 4 and 5 which will be detailed below.

Each planet gear 3 comprises a first set of teeth 31 engaging with both the sun gear 61 of the drive member 6 and with a first stationary ring gear 4, and a second set of teeth 32 engaging with a second ring gear 5 rotationally rigid with the drive shaft 8. Each planet gear 3 also has a circular outer bearing surface 33. It should be noted that this type of planetary gear train is sometimes called a 'Wolfrom' system.

The second ring gear 5 is part of a driven gear 50 also called the follower 50, comprising a disc portion 52, an annular portion on the periphery of the disc portion with the teeth of said second ring gear 5, and a cylindrical inner bearing surface 53. The driven gear 50 also comprises a cylindrical hub 51 with a central axial through-hole for receiving the drive shaft 8.

Figure 6:
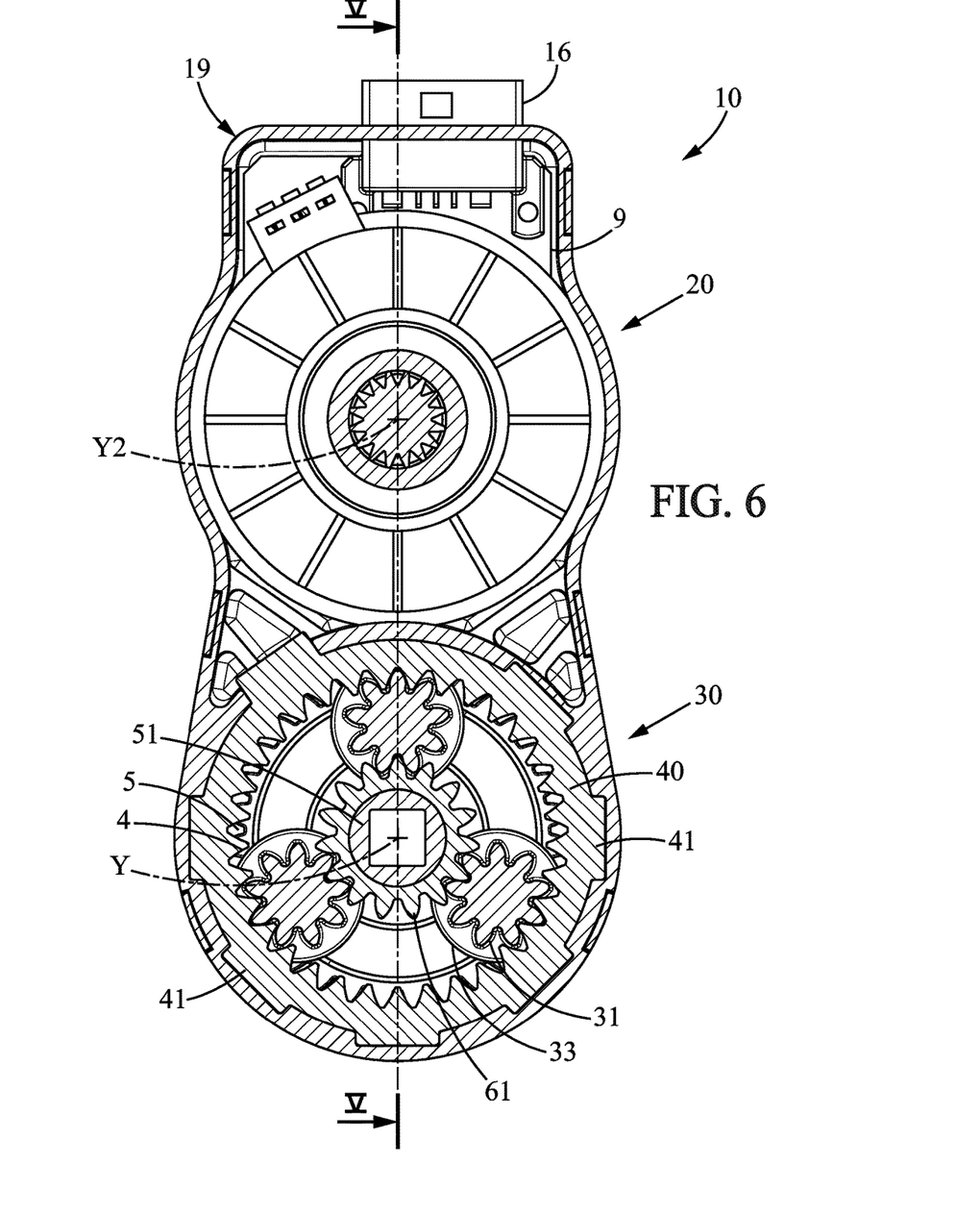
FIG. 6 is a transverse section view of the reduction gear of the drive device of FIG. 1, along line VI-VI of FIG. 4.

The planet gears 3 are held in place radially by their circular outer bearing surface 33 which presses against both the cylindrical inner bearing surface 53 and the outside of the hub 51 (FIG. 6).

The first ring gear 4 is part of a stationary flat ring 40 which comprises radial indentations 41 that are received in complementary shapes provided inside the casing 19 (FIG. 6).

The rotor 2 of the brushless motor 20 may be in the form of a substantially flat disc perpendicular to the axis of rotation Y2. As is known per se, the rotor disc is equipped with permanent magnets; facing them are the coils of electromagnets controlled by a control unit 9 arranged in immediate proximity to the brushless motor 20. The current flowing in each coil is controlled to generate a rotating magnetic field capable of imparting rotational movement to the rotor. The rotational speed of the rotating field can be controlled by the control unit 9. Typically, rotational speeds of between 2000 revolutions per minute (2000 rpm) and 7000 revolutions per minute (7000 rpm) will be chosen, and preferably between 2000 rpm and 4000 rpm.

The rotor 2 is rotatably connected to a driven gear 22 which is coupled to a driving gear 66 of the planetary gear train 30.

Figure 2:
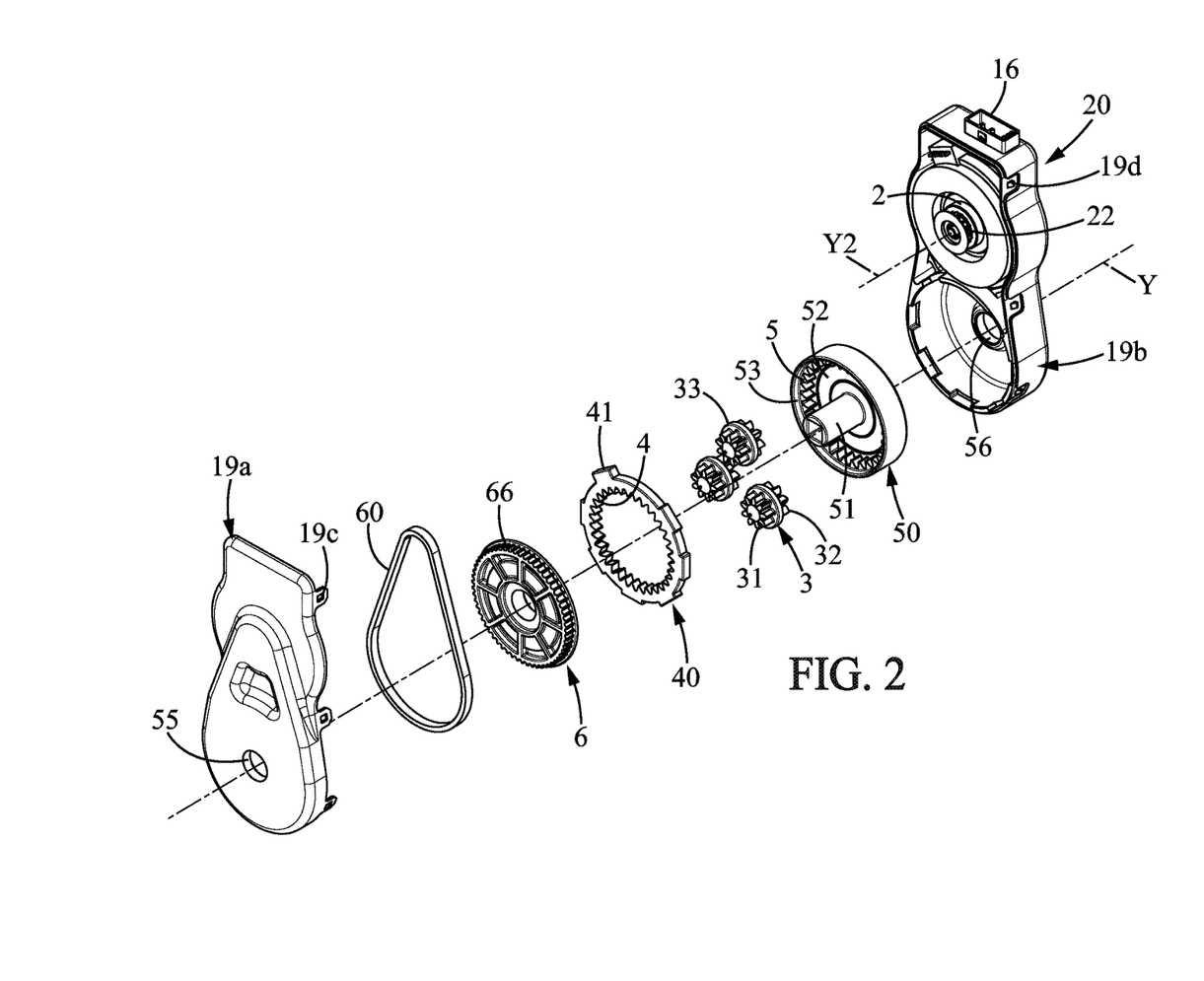
FIG. 2 is an exploded view of the drive device of FIG. 1, viewed from one side.
Figure 3:
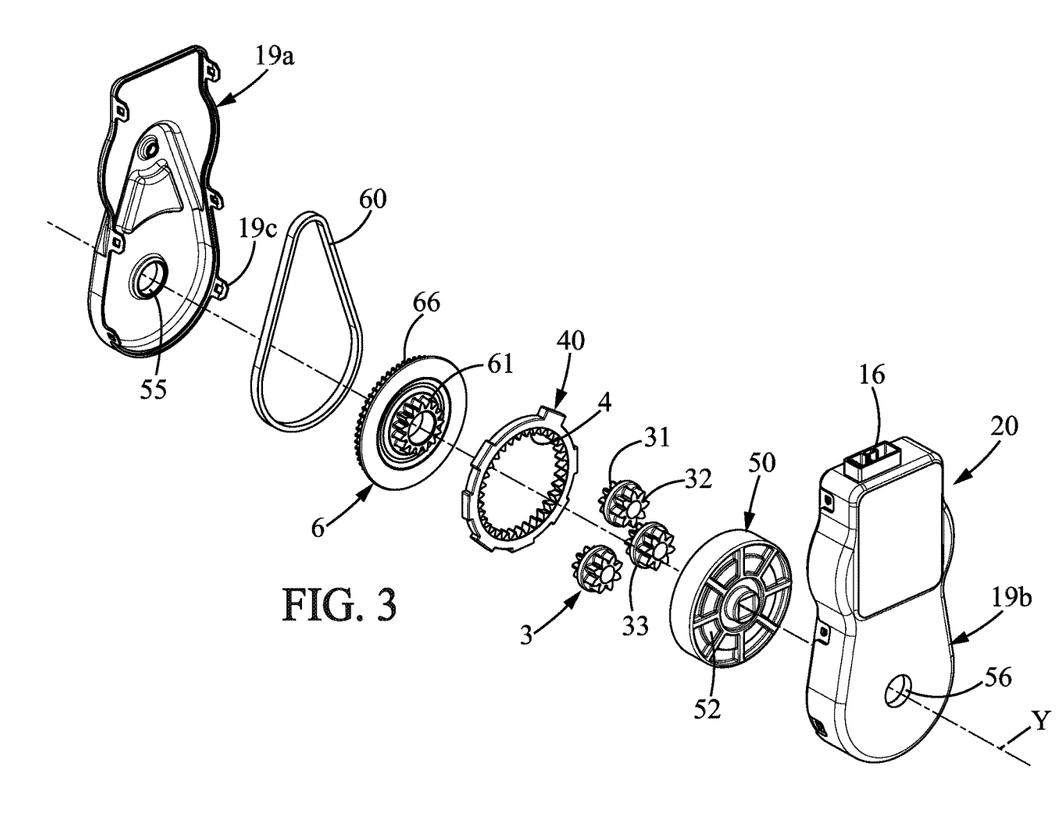
FIG. 3 is an exploded view of the drive device of FIG. 1, viewed from the opposite side.
Figure 4:
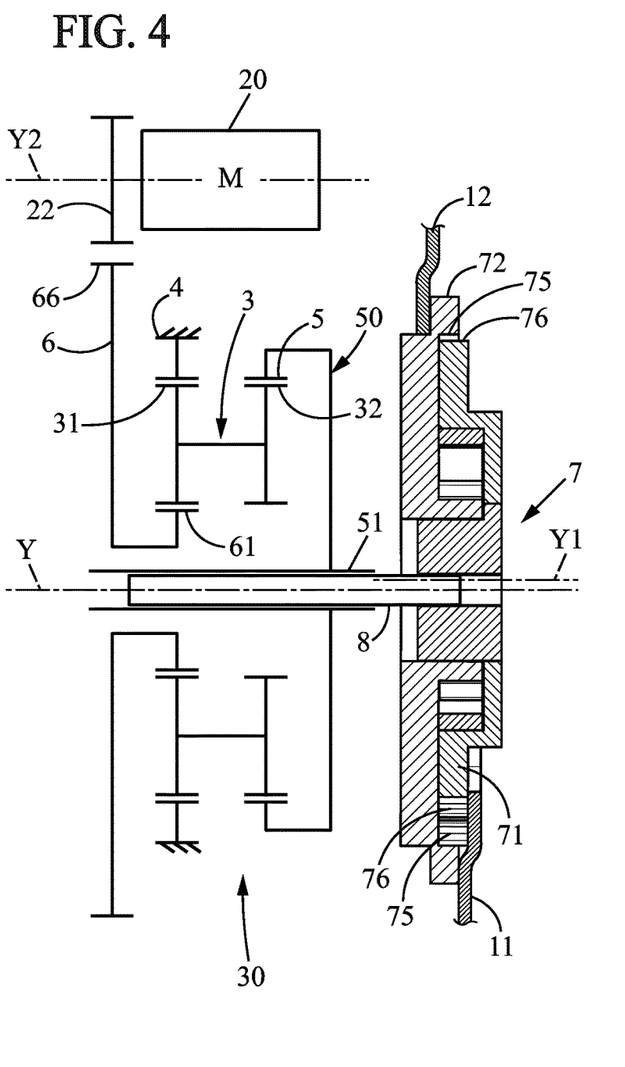
FIG. 4 is a schematic axial section diagram of the motor-driven hinge device of FIG. 1.
Figure 5:
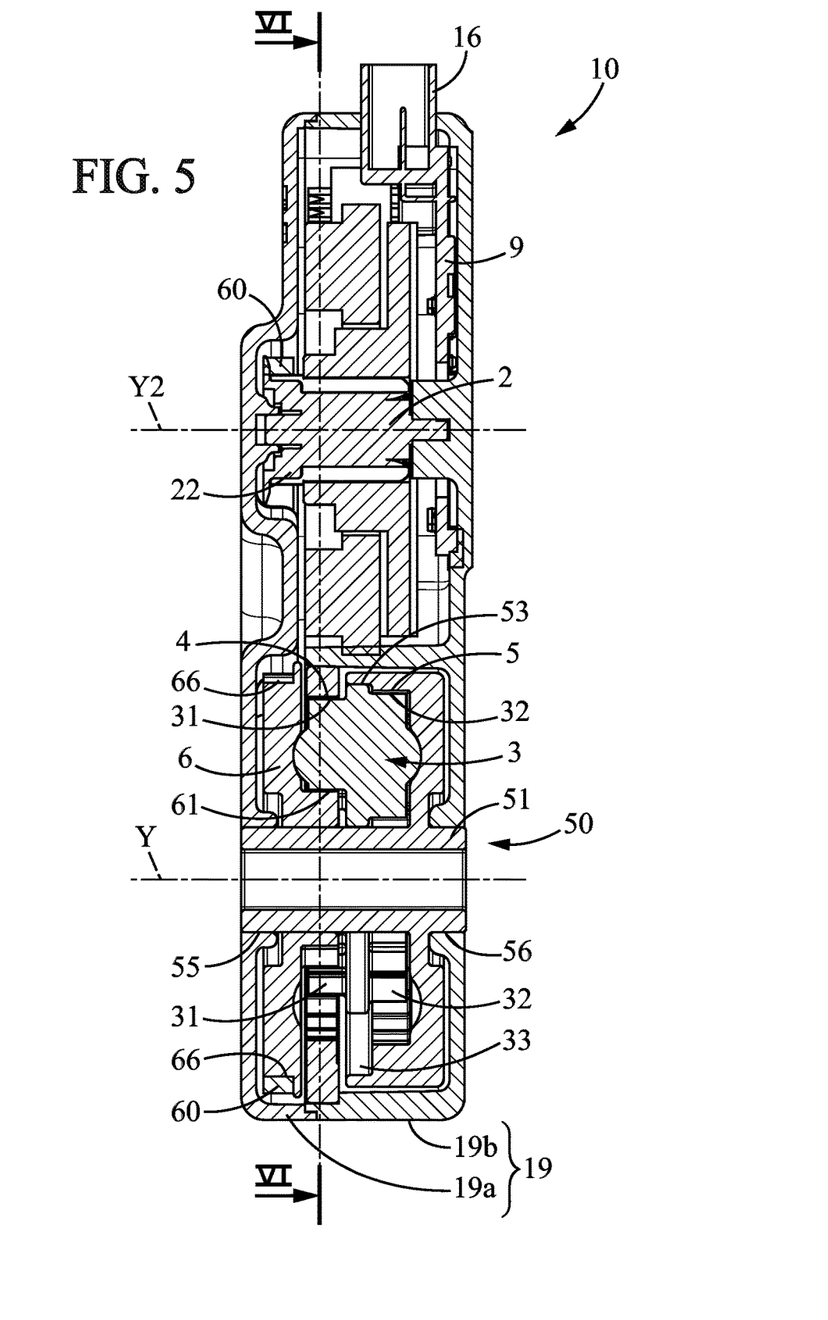
FIG. 5 is a transverse section view of the reduction gear of the drive device of FIG. 1, along line VV of FIG. 4.

The coupling between the driven gear 22 of the motor and the driving gear 66 of the planetary gear train may be implemented as a transmission belt 60, as shown in FIGS. 2 and 3, for example a belt made of elastomeric material, for example a toothed belt; alternatively, as represented in FIG. 4, it may be a direct engagement of one gear with the other.

According to the invention, driven gear 50 is implemented as a single piece made of molded plastic.

In addition, advantageously according to the invention, all parts of the planetary gear train may be made of plastic. In another advantageous and optional aspect, the planetary gear train has no planet carrier. In another advantageous and optional aspect, the planetary gear train is without ball bearings or roller bearings.

In the example shown, the brushless motor 20, the planetary gear train 30, and the control unit 9 are contained in the closed casing 19.

More specifically, the casing 19 is formed as a protective housing in the form of two half-casings 19a, 19b assembled together by attachment means such as snap-fitting means 19c, 19d. This casing protects the internal components of the device 1, particularly the motor 20, the reduction gear 30, and the control unit 9, from the outside environment.

In addition, within this casing 19 are provided a first thrust bearing 55 and a second thrust bearing 56 to support the rotational movement of the driven gear 50. Similarly, the casing may additionally comprise bearings for the motor rotor.

The motor-driven hinge device 1 also comprises an electrical connector 16 provided for supplying electric power and signals to the motor 20.

In general, a reduction ratio of between 50 and 150 is selected for the planetary gear train.

This can be achieved by having a different number of teeth on the first and second rings 4,5 and/or a different number of teeth in the first and second sets of teeth 31,32 of the planet gears 3.

The general formula for the reduction ratio of the planetary gear train can be written as follows:

$$R = \frac{1 + \frac{Z_4}{Z_{61}}}{1 - \frac{Z_{32}Z_4}{Z_{31}Z_5}}$$

where $Z_{61}$ is the number of teeth on the sun gear 61, $Z_{31}$ and $Z_{32}$ are respectively the number of teeth in the first set of teeth 31 and in the second set of teeth 32 of the planet gears, $Z_4$ is the number of teeth on the first ring (stationary), and $Z_5$ is the number of teeth on the second ring 5 (driven).

In the illustrated example the two characteristics are combined, with $Z_{61}=15$, $Z_{31}=8$, $Z_{32}=9$, $Z_4=31$, and $Z_5=33$, to obtain R=54.

If $Z_{31}=8$, $Z_{32}=8$, $Z_4=31$, and $Z_5=32$, R=98 is obtained, with reversal of the direction of rotation.

These choices allow obtaining a very favorable reduction ratio for the planetary gear train with satisfactory performance and an optimal rotational speed as mentioned above for the motor.

The reader will understand that the belt drive 60 additionally introduces a reduction factor that is typically between 2 and 3 depending on the respective diameters of the driven gear 22 and the driving gear 66 of the reduction gear train.

According to the first embodiment, the reduction gear and the brushless motor 20 are arranged next to each other substantially in a plane perpendicular to the main axis Y, and are interconnected by the belt 60. A configuration is thus obtained that is referred to as "flat", meaning an advantageous dimension along the Y axis, for example less than 40 mm, and the device can be installed on the inner side against the backrest side plate 12.

The drive shaft 8, here of square cross-section, is coupled to the central hub 51 by their complementary shapes, is in the form of a shaft 8 connecting the hypocycloid hinge mechanism 7 of the right side to the hypocycloid hinge mechanism 7' of the left side, passing from one side to the other of the reduction gear 30 inside the hub 51.

The control unit 9 is configured to control the current in each coil and to monitor the proper operation of the brushless motor, and can manage a plurality of additional functions such as managing saved positions, compensating for variations in supply voltage, assisting with diagnostics, etc.

In particular, the control unit 9 may control the motor according to current delivery profiles with startup and shutdown ramps, to provide smooth starts and stops. This also limits the emission of electromagnetic interference associated with startup and shutdown transitions.

Figure 7:
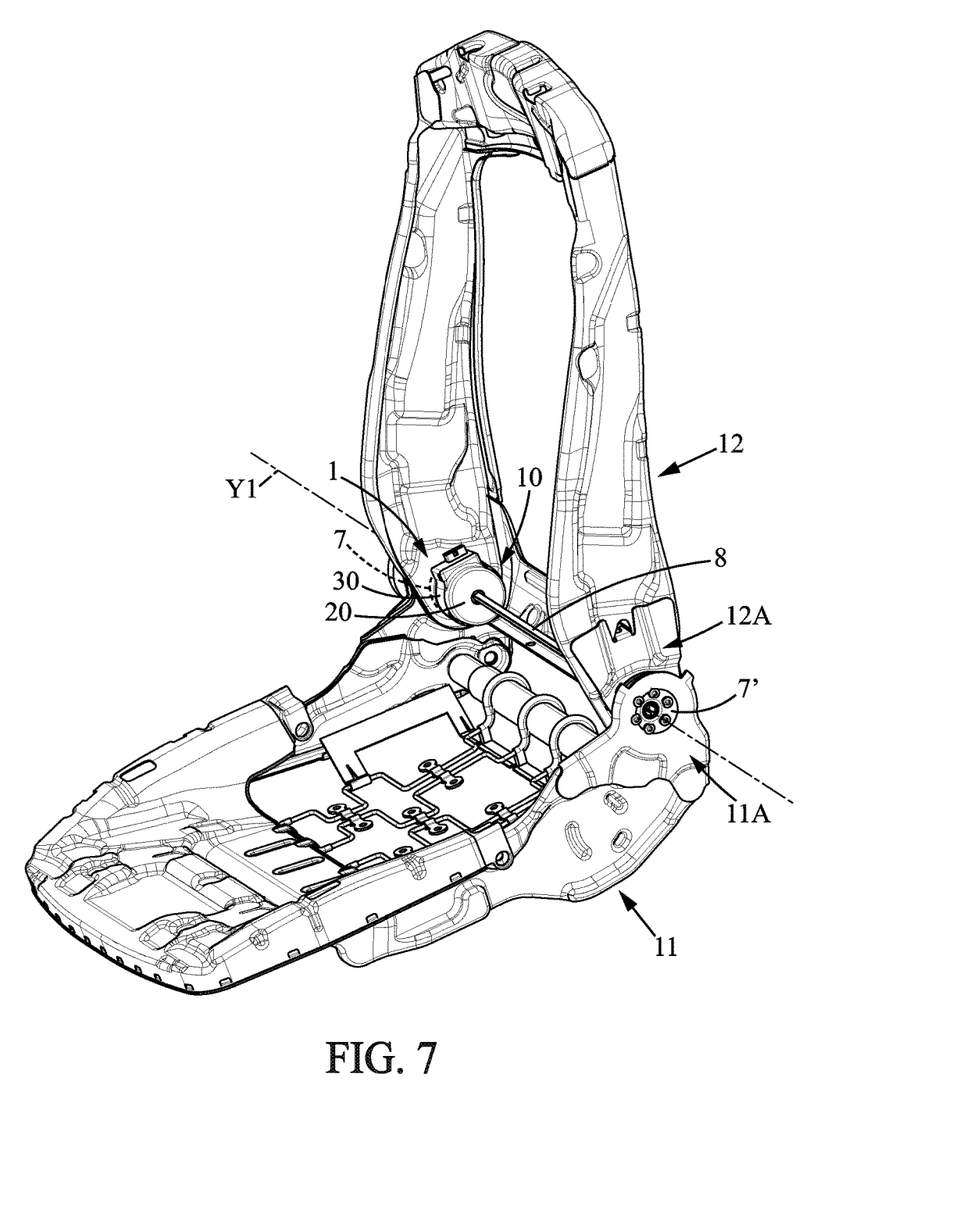
FIG. 7 is a perspective view of a seat frame incorporating a motor-driven hinge device according to a second embodiment of the invention.

According to a second embodiment, represented in FIGS. 7 to 11, the reduction gear 30 and the brushless motor 20 are arranged coaxially, end to end, the axis of the rotor Y2 coinciding with the main axis Y. This provides a configuration referred to as "axial cylindrical", meaning it has an advantageous radial dimension, for example a diameter of less than 6 cm, and the device can be installed on the inner side against the backrest side plate 12, as illustrated in FIG. 7.

In this second embodiment, only the elements that differ from those of the first embodiment will be discussed, as the others are considered to be similar or identical.

In this configuration, the rotor 2 and the drive member 6 are directly coupled; alternatively they may be a single part. The stator and rotor 2 of the motor comprise an axial through-hole allowing the passage of the drive shaft 8 which traverses the gearmotor 10.

Figure 11:
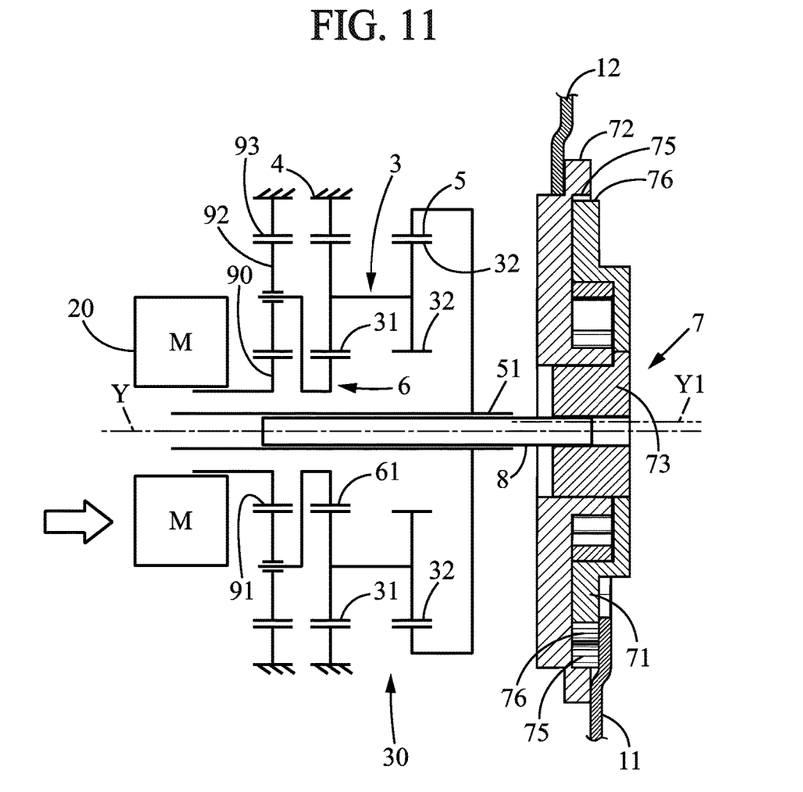
FIG. 11 represents a variant of the motor-driven hinge device of FIG. 7.

According to the variant shown in FIG. 11, an additional planetary gear train is inserted to facilitate the outputs of the different gear stages; in this configuration, the motor rotor is connected to the sun gear 90,91 of the additional gear train, which drives the planet gears 92 supported by a planet carrier 6 which forms the driving gear 61 of the main planetary gear train 30. An outer ring 93 is arranged in a fixed manner, possibly combined with the abovementioned stationary ring 40. The other elements relating to the variant of FIG. 11 are not described again here because they are identical or similar to those previously described.

To give an example, if the motor is used at 7000 rpm with a reduction ratio of 100 in the planetary gear train, we obtain 70 rpm as input to the hinge mechanism 7 which introduces a reduction factor of 35; in which case a rotation of 2 rpm is obtained for the backrest (12 degrees per second). With an additional planetary gear train (FIG. 11), the speed can be reduced to less than 1 rpm, as can also be obtained with the belt drive of the first embodiment.

It should be noted that according to the invention, the motor-driven hinge device 1 can be arranged to move, within a motor vehicle, any movable element mounted to be movable relative to a reference element, by means of a hinge device interposed between the movable element and the reference element.

The invention claimed is:

1. A motor-driven hinge device adapted to connect a backrest of a motor vehicle seat to a seating portion of said seat, in a rotational movement about a hinge axis; comprising:
 a first hypocycloid hinge mechanism driven by a drive shaft, comprising a first metal side plate for connection to the seating portion and a second metal side plate for connection to the backrest, the first and second side plates being connected by metal toothed sectors;
 a brushless motor having a rotor rotating about a rotor axis parallel to the hinge axis,
 a planetary gear train interposed between the brushless motor and the drive shaft, the planetary gear train comprising a sun gear rotating about a main axis and connected to the motor rotor, a plurality of planet gears; each planet gear comprising: a first set of teeth engaging with the sun gear and with a first stationary ring gear, and a second set of teeth engaging with a second ring gear rigid with the drive shaft, wherein the planetary gear train has no planet carrier.

2. The motor-driven hinge device according to claim 1, wherein all parts of the planetary gear train are made of plastic.

3. The motor-driven hinge device according to claim 1, further comprising a control unit arranged in immediate proximity to the brushless motor, for controlling said brushless motor; said brushless motor; the planetary gear train, and the control unit being contained in a closed housing.

4. The motor-driven hinge device according to claim 1, wherein the first set of teeth and the second set of teeth differ in their number of teeth by 1, and/or the number of teeth of the first ring gear differs from the number of teeth of the second ring gear.

5. The motor-driven hinge device according to claim 1, wherein the reduction ratio of the planetary gear train is between 50 and 150 and the rotational speed of the motor is between 2000 revolutions/min and 7000 revolutions/min.

6. The motor-driven hinge device according to claim 1, wherein the planetary gear train and the brushless motor are arranged one beside the other in a plane perpendicular to the main axis, and are interconnected by a belt.

7. The motor-driven hinge device according to claim 1, wherein the planetary gear train and the brushless motor are arranged one after the other in the axial direction.

8. A seat frame for a motor vehicle, comprising a backrest frame, a seating portion frame, and at least one motor-driven hinge device according to claim 1.

9. The seat frame according to claim 8, comprising a second hypocycloid hinge mechanism arranged on the side opposite to the first hypocycloid hinge mechanism, the drive shaft passing axially through the planetary gear train and connecting the two hypocycloid hinge mechanisms.

10. A motor vehicle seat comprising at least one motor-driven hinge device adapted to connect a backrest of a motor vehicle seat to a seating portion of said seat, in a rotational movement about a hinge axis, the motor-driven hinge device comprising:
 a first hypocycloid hinge mechanism driven by a drive shaft, comprising a first metal side plate for connection to the seating portion and a second metal side plate for connection to the backrest, the first and second side plates being connected by metal toothed sectors,
 a brushless motor having a rotor rotating about a rotor axis parallel to the hinge axis,
 a planetary sear train interposed between the brushless motor and the drive shaft, the planetary gear train comprising a sun sear rotating about a main axis and connected to the motor rotor, a plurality of planet gears, each planet sear comprising: a first set of teeth engaging with the sun sear and with a first stationary ring gear, and a second set of teeth engaging with a second ring sear rigid with the drive shaft, wherein the planetary sear train has no planet carrier.

* * * * *